(12) United States Patent
Park et al.

(10) Patent No.: US 11,535,252 B2
(45) Date of Patent: Dec. 27, 2022

(54) ELECTRONIC APPARATUS AND METHOD OF ASSISTING DRIVING OF VEHICLE

(71) Applicant: SAMSUNG ELECTRONICS CO., LTD., Suwon-si (KR)

(72) Inventors: Yosub Park, Suwon-si (KR); Seok Namkoong, Suwon-si (KR); Boseok Moon, Suwon-si (KR)

(73) Assignee: SAMSUNG ELECTRONICS CO., LTD., Suwon-si (KR)

(*) Notice: Subject to any disclaimer, the term of this patent is extended or adjusted under 35 U.S.C. 154(b) by 430 days.

(21) Appl. No.: 16/735,959

(22) Filed: Jan. 7, 2020

(65) Prior Publication Data
US 2020/0216075 A1 Jul. 9, 2020

(30) Foreign Application Priority Data
Jan. 7, 2019 (KR) .................. 10-2019-0001928

(51) Int. Cl.
*B60W 30/18* (2012.01)
*G05D 1/02* (2020.01)
*G05D 1/00* (2006.01)
*G06V 10/22* (2022.01)
*G06V 20/58* (2022.01)

(52) U.S. Cl.
CPC ..... *B60W 30/18163* (2013.01); *G05D 1/0088* (2013.01); *G05D 1/0214* (2013.01); *G06V 10/22* (2022.01); *G06V 20/58* (2022.01); *B60W 2554/4041* (2020.02); *B60W 2554/4042* (2020.02); *G06V 2201/08* (2022.01)

(58) Field of Classification Search
CPC ... B60W 30/18163; B60W 2554/4041; B60W 2554/4042; G06V 20/58; G06V 10/22; G06V 2201/08; G05D 1/0088; G05D 1/0214
See application file for complete search history.

(56) References Cited

U.S. PATENT DOCUMENTS

| 6,687,577 B2 | 2/2004 | Strumolo |
| 8,466,807 B2 | 6/2013 | Mudalige |
| 8,977,007 B1 | 3/2015 | Ferguson et al. |

(Continued)

FOREIGN PATENT DOCUMENTS

| KR | 10-2018-0070402 A | 6/2018 |
| KR | 10-2018-0112336 A | 10/2018 |

OTHER PUBLICATIONS

International Search Report and Written Opinion (PCT/ISA/210 and PCT/ISA/237), dated Apr. 23, 2020 by International Searching Authority in International Application No. PCT/KR2020/000228.

*Primary Examiner* — Michael D Lang
(74) *Attorney, Agent, or Firm* — Sughrue Mion, PLLC

(57) ABSTRACT

The electronic apparatus includes a sensing unit including at least one sensor, a memory storing one or more instructions, and a processor configured to execute the one or more instructions stored in the memory to identify an object located near the vehicle, by using the at least one sensor, generate risk information of the object, the risk information including a type of the identified object, adjust a size of a bounding box generated to include at least a part of the identified object, based on the risk information of the object, and control a driving operation of the vehicle, based on the adjusted bounding box.

18 Claims, 16 Drawing Sheets

(56) References Cited

U.S. PATENT DOCUMENTS

| | | |
|---|---|---|
| 9,868,446 B1 | 1/2018 | Zhu et al. |
| 10,535,269 B2 | 1/2020 | Um et al. |
| 2015/0110344 A1 | 4/2015 | Okumura |
| 2018/0113476 A1 | 4/2018 | Giles et al. |
| 2018/0126984 A1 | 5/2018 | Liu et al. |
| 2018/0129886 A1 | 5/2018 | Ogale et al. |
| 2018/0137756 A1* | 5/2018 | Moosaei et al. |
| 2018/0174462 A1* | 6/2018 | Um ................... B60W 30/09 |

* cited by examiner

ELECTRONIC APPARATUS AND METHOD OF ASSISTING DRIVING OF VEHICLE

CROSS-REFERENCE TO RELATED APPLICATIONS

This application is based on and claims priority under 35 U.S.C. § 119 to Korean Patent Application No. 10-2019-0001928, filed on Jan. 7, 2019, in the Korean Intellectual Property Office, the disclosure of which is incorporated by reference herein in its entirety.

BACKGROUND

1. Field

The disclosure relates to an electronic apparatus and an operation method thereof, and more particularly, an electronic apparatus and a method of assisting driving of a vehicle.

2. Description of Related Art

Due to the convergence of information and communication technology and the automotive industry, the smartification of vehicle's has undergone rapid progress. Due to smartification, vehicles are evolving from simple mechanical devices into smart cars, and particularly, autonomous driving is regarded as a key technology of smart cars.

Autonomous driving refers to a technology by which a vehicle autonomously travels to a destination without manipulation of a steering wheel, a gas pedal, a brake, etc. by a driver.

These days, a variety of additional functions related to autonomous driving are being continuously developed, and research on methods capable of providing a safe autonomous driving environment to a driver or a passenger by controlling a vehicle by recognizing and determining a driving environment by using various types of data is underway.

SUMMARY

In accordance with the disclosure, there is provided are an electronic apparatus and a method of assisting driving of a vehicle, and a computer-readable recording medium having recorded thereon a computer program for executing the method.

Additional aspects will be set forth in part in the description which follows and, in part, will be apparent from the description, or may be learned by practice of the presented embodiments of the disclosure.

In accordance with an aspect of the disclosure, an electronic apparatus for assisting driving of a vehicle includes a sensing unit including at least one sensor, a memory storing one or more instructions, and a processor configured to execute the one or more instructions stored in the memory to recognize an object located near the vehicle, by using the at least one sensor, generate risk information of the object, the risk information including a type of the recognized object, adjust a size of a bounding box generated to include at least a part of the recognized object, based on the risk information of the object, and control a driving operation of the vehicle, based on the adjusted bounding box.

In accordance with an aspect of the disclosure, a method of assisting driving of a vehicle includes recognizing an object located near the vehicle, by using at least one sensor, generating risk information of the object, the risk information including a type of the recognized object, adjusting a size of a bounding box generated to include at least a part of the recognized object, based on the risk information of the object, and controlling a driving operation of the vehicle, based on the adjusted bounding box.

In accordance with an aspect of the disclosure, a computer-readable recording medium having recorded thereon a computer program for executing the method may also be provided.

BRIEF DESCRIPTION OF THE DRAWINGS

The above and other aspects, features, and advantages of certain embodiments of the disclosure will be more apparent from the following description taken in conjunction with the accompanying drawings, in which:

FIGS. 5A and 3B are diagrams showing examples in which an electronic apparatus adjusts a bounding box, based on risk information of an object, according to an embodiment;

DETAILED DESCRIPTION

Although the terms used herein are selected, as much as possible, from general terms that are widely used at present while taking into consideration the functions obtained, in accordance with the disclosure, these terms may be replaced by other terms based on intentions of one of ordinary skill in the art, customs, emergence of new technologies, or the like. In a particular case, terms that are arbitrarily selected by the applicant may be used and, in this case, the meanings of these terms may be described in corresponding parts of the detailed description. Therefore, it is noted that the terms used herein are construed based on practical meanings thereof and the whole content of this specification, rather than being simply construed based on names of the terms.

It will be understood that the terms "comprises", "comprising", "includes" and/or "including", when used herein, specify the presence of stated elements, but do not preclude the presence or addition of one or more other elements. The term " . . . unit" or " . . . module" is used to denote an entity for performing at least one function or operation, and may be implemented using hardware, software, or a combination of hardware and software.

Reference will now be made in detail to embodiments of the disclosure, examples of which are illustrated in the accompanying drawings. The disclosure may, however, be embodied in many different forms and is not construed as being limited to the embodiments of the disclosure set forth herein.

Figure 1:
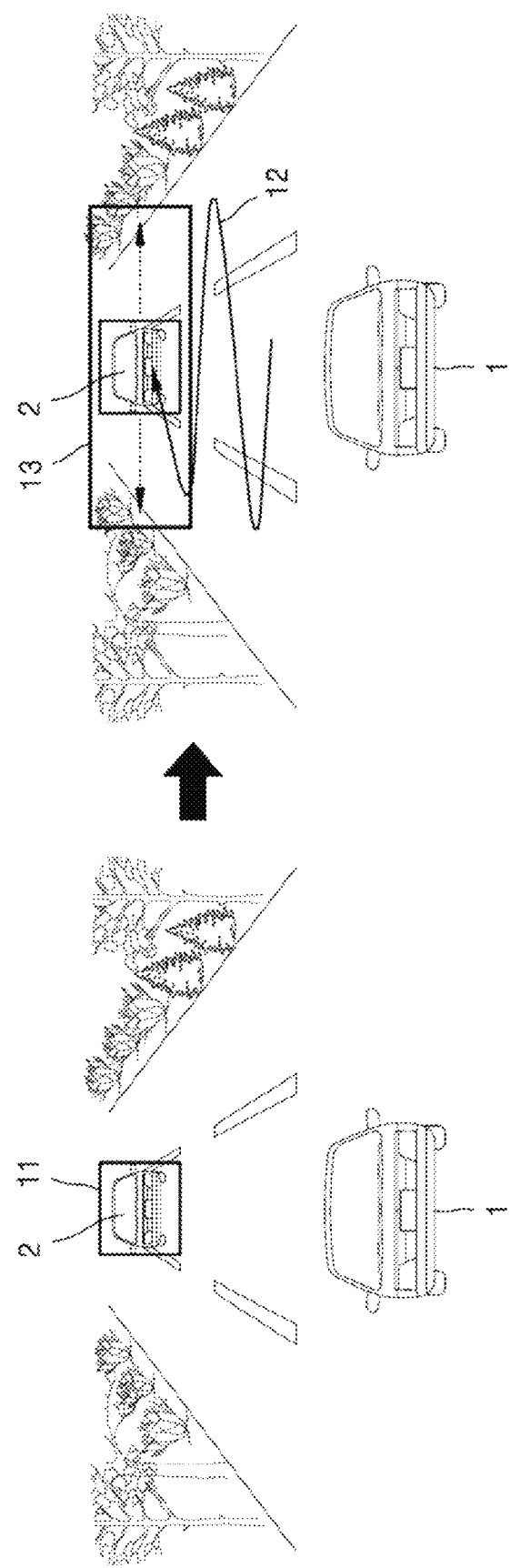
FIG. 1 is a diagram of an example in which an electronic apparatus for assisting driving of a vehicle operates, according to an embodiment.

FIG. 1 is a diagram for describing an example in which an electronic apparatus 100 for assisting driving of a vehicle operates, according to an embodiment.

As used herein, the vehicle 1 (illustrated in FIG. 1 and also referred to as an autonomous vehicle 1) may include the electronic apparatus 100 (illustrated in FIGS. 14 and 15) for assisting driving of the vehicle 1. The electronic apparatus 100 according to an embodiment may be mounted and operate in the vehicle 1 in such a manner that the vehicle 1 may be autonomously driven or may autonomously control some of driving operations. For example, the vehicle 1 may be configured to perform functions of an autonomous driving system or an advanced driver assistance system (ADAS).

A vehicle capable of being autonomously driven or of autonomously controlling at least some functions may provide a stable driving environment by recognizing nearby objects of the vehicle by using various sensors while the vehicle is being driven.

The objects according to an embodiment refer to objects sensed near (e.g., in front, rear, and side directions of) the vehicle while the vehicle is being driven, and examples thereof may include pedestrians, other vehicles, and obstructions on a driving route, but are not limited thereto.

According to an embodiment, the electronic apparatus 100 mounted in the vehicle 1 may classify each object recognized, i.e., identified, near the vehicle 1, by using a single bounding box, and control a driving operation of the vehicle 1 in consideration of the object classified using the bounding box. For example, the vehicle may be controlled to stay clear of a space corresponding to at least the bounding box.

According to an embodiment, the electronic apparatus 100 may generate a bounding box to include at least a part of a recognized object or an entirety of the recognized object.

For example, the bounding box may be generated in a rectangular shape capable of most tightly including the recognized object. In this case, an aspect ratio of the rectangular shape is not fixed as long as the entire outline of the object is included therein. For example, the bounding box may be generated in a rectangular shape including the maximum or minimum width of the recognized object and having a certain aspect ratio, but is not limited thereto. The electronic apparatus 100 according to an embodiment may preset or change criteria for generating the bounding box surrounding the recognized object.

According to an embodiment, the electronic apparatus 100 may adjust the size of the bounding box by analyzing a status of the recognized object.

Referring to FIG. 1, while the vehicle 1 is being driven, upon determining that a front vehicle 2, e.g., another vehicle in a front direction of the vehicle 1 is, for example, being driven in zigzags as indicated by reference numeral 12, the electronic apparatus 100 may extend a bounding box 11 including the front vehicle 2, to a size including the front vehicle 2 and left and right nearby regions adjacent to the front vehicle 2. The electronic apparatus 100 may control a driving operation of the autonomous vehicle 1 on the assumption that the front vehicle 2 is recognized based on the extended bounding box 13.

According to an embodiment, the electronic apparatus 100 may prevent the vehicle 1 from being driven through an empty space adjacent to the front vehicle 2, by controlling a driving operation of the vehicle 1 on the assumption that the object (i.e., the front vehicle 2) occupies the extended bounding box 13.

For example, when the front vehicle 2 is being driven in zigzags because of reckless driving or driving under the influence of alcohol, many unpredictable risks may exist. Therefore, when the autonomous vehicle 1 recognizes only a current location of the front vehicle 2 and attempts to change lanes and accelerate to pass the front vehicle 2, a sudden turn of the front vehicle 2 may cause an accident.

As another example, after a traffic accident occurs on a motorway or an expressway, a police car may be driven in zigzags for a traffic break to prevent secondary accidents of other vehicles behind. That is, when vehicles proceed toward the site of the accident at high speeds, an emergency vehicle (e.g., a police car or an ambulance) may be driven in zigzags on purpose to slow down following vehicles to, for example, 30 km/h or less. In this case, when the autonomous vehicle attempts to accelerate to pass the police car ahead, a risk of a secondary accident of the autonomous vehicle 1 run be increased and the effect of the traffic break may be reduced.

According to an embodiment, upon determining that the front vehicle 2 is being driven dangerously, the autonomous vehicle 1 may extend the bounding box 11 including the front vehicle 2, to a size including the front vehicle 2 and nearby regions adjacent to the front vehicle 2, control a driving operation, based on the extended bounding box 13, and thus be slowly driven and keep a safe distance from the front vehicle 2 without attempting to approach and pass the front vehicle 2. That is, according to an embodiment, the electronic apparatus 100 may provide a safe autonomous driving environment by adjusting the size of the bounding box.

FIG. 1 illustrates an embodiment of the disclosure, and the disclosure is not limited thereto.

Figure 2:
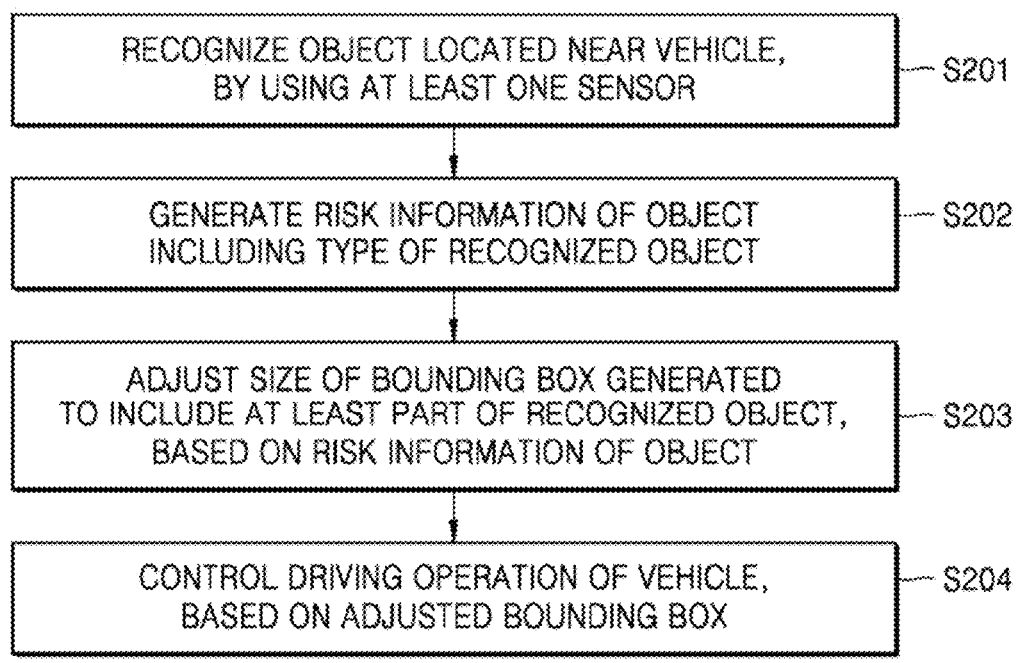
FIG. 2 is a flowchart of an operation method of an electronic apparatus, according to an embodiment.

FIG. 2 is a flowchart of an operation method of the electronic apparatus 100, according to an embodiment.

In operation S201 of FIG. 2, the electronic apparatus 100 may recognize an object located near the vehicle 1, by using at least one sensor.

For example, the electronic apparatus 100 may recognize another vehicle being driven near (e.g., in a front, rear, or side direction of) the vehicle 1, a pedestrian, or an obstruction near a driving route by using a sensing unit 110 (see FIG. 15) that provides sensing data.

According to an embodiment, the sensing unit 110 (see FIG. 15) including a radar sensor 226 (see FIG. 15), a lidar sensor 227 (see FIG. 15), an image sensor or image sensors 228 (see FIG. 15), etc., may sense another vehicle, a pedestrian, or the like near the vehicle 1.

The electronic apparatus 100 mounted in the vehicle 1 according to an embodiment may photograph a surrounding environment of the vehicle 1 by using the image sensor 228 including a camera (see FIG. 15) while the vehicle 1 is being driven, and detect and track an object in an image obtained by photographing the surrounding environment.

The image sensor 228 (see FIG. 15) may be a still camera or a video camera configured to photograph an external environment of the vehicle 1. For example, the image sensor 228 may include a plurality of cameras, and the plurality of cameras may be positioned at a plurality of locations inside and outside the vehicle 1.

According to an embodiment, the electronic apparatus 100 mounted in the vehicle 1 may photograph the surrounding environment of the vehicle 1 by using the plurality of image sensors 228, for example, cameras, and perform object detection by using a trained data recognition model based on deep learning, to detect an object in a plurality of image frames obtained by photographing the surrounding environment of the vehicle 1.

According, to an embodiment, the object detection may be an image processing operation for detecting an object (e.g., a pedestrian or a vehicle on a road) included in an image frame.

The object detection may be an image processing operation for extracting a candidate region in an image frame, and estimating the type and a location of an object in the candidate region by using a trained data recognition model, to detect the object in the image frame. According to an embodiment, the object detection may use a data recognition model based on, for example, a convolutional neural network (CNN).

According to an embodiment, the lidar sensor 227 (see FIG. 15) may sense, for example, a shape of, a distance to, or geographical features of a nearby object by irradiating laser beams by using a laser irradiator, and obtaining a reflected signal from the object through at least one laser receiver.

The radar sensor 226 (see FIG. 15) may be a sensor configured to sense objects in the surrounding environment of the vehicle 1 by using radio signals. The radar sensor 226 may be configured to detect speeds and/or directions of the objects.

In operation S202 of FIG. 2, the electronic apparatus 100 may generate risk information of the object including the type of the recognized object.

According to an embodiment, the risk information of the object may be information about the object recognized near the vehicle 1, and include the type of the object. According to an embodiment, the risk information of the object may include the type of the object (e.g., a vehicle, a bicycle, a person, or an obstruction) which is obtained by analyzing the object recognized near the vehicle 1 by using sensing unit 110 (see FIG. 15).

According to an embodiment, the risk information of the object may further include a risk level of the object. According to an embodiment, the electronic apparatus 100 may generate the risk information of the object by analyzing the type of the recognized object and the risk level of the object by using sensing unit 110 (see FIG. 15).

According to an embodiment, the electronic apparatus 100 may determine the risk level of the object by tracking, motion of the recognized object by using sensing unit 110 (see FIG. 15) and/or monitoring other objects around the vehicle 1 and the front vehicle 2. For example, the electronic apparatus 100 may store a table in which risk levels, e.g., from 0 to 10, are associated with the types of the objects, moving speeds, distances, weather conditions, the road surface conditions, visibility, surrounding landmarks, etc., but this is not limiting.

According to an embodiment, the electronic apparatus 100 may determine the risk level of the object, based on at least one of the type of the object, the size of the object, a speed of the object, a direction of the object, a distance between the vehicle 1 and the object, or a space around the object.

For example, when the object recognized in a front direction of the autonomous vehicle 1 is a vehicle, the electronic apparatus 100 may determine a risk level of the front vehicle by sensing a driving speed, a driving direction, etc. of the front vehicle. For example, when the front vehicle repeats sudden acceleration and lane change, the risk level of the front vehicle may be determined to be high, for example, a risk level 10, which is predetermined to be the highest risk level on a scale from 0 to 10, but this is not limiting.

In operation S203 of FIG. 2, the electronic apparatus 100 may adjust the size of a bounding box generated to include at least a part of the recognized object, based on the risk information of the object.

According to an embodiment, the electronic apparatus 100 may determine an extension direction of the bounding box, based on the risk information of the object.

According to an embodiment, the electronic apparatus 100 may determine whether to extend the bounding box in a horizontal direction and/or a vertical direction. For example, the electronic apparatus 100 may extend the bounding box in both of the horizontal direction and the vertical direction when the risk level of the object is determined to be higher based on the risk information of the object, for example, the risk level is determined to be above 5.

According to an embodiment, the electronic apparatus 100 may adjust an extension ratio of the bounding box, based on the risk information of the object. For example, the electronic apparatus 100 may adjust the extension ratio of the bounding box to be high when the risk level of the object is determined to be higher based on the risk information of the object, and adjust the extension ratio of the bounding box to be low when the risk level of the object is determined to be lower, for example, equal to or less than 5.

According to an embodiment, the electronic apparatus 100 may adjust the extension ratio of the bounding box to be low when the risk level of the same object is reduced as a result of continuously recognizing the object while the vehicle 1 is being driven.

In operation S204 of FIG. 2, the electronic apparatus 100 may control a driving operation of the vehicle 1, based on the adjusted bounding box.

According to an embodiment, a processor 120 (see FIG. 14 or 15) of the electronic apparatus 100 may transmit signals to a plurality of driving modules in such a manner that a driving operation of the vehicle 1 is controlled based on the adjusted bounding box.

According to an embodiment, the electronic apparatus 100 may provide a safe autonomous driving environment by adaptively adjusting the size of the bounding box including the object, based on a status of the object recognized near the vehicle 1.

FIG. 2 illustrates an embodiment of the disclosure, and the disclosure is not limited thereto.

Figure 3:
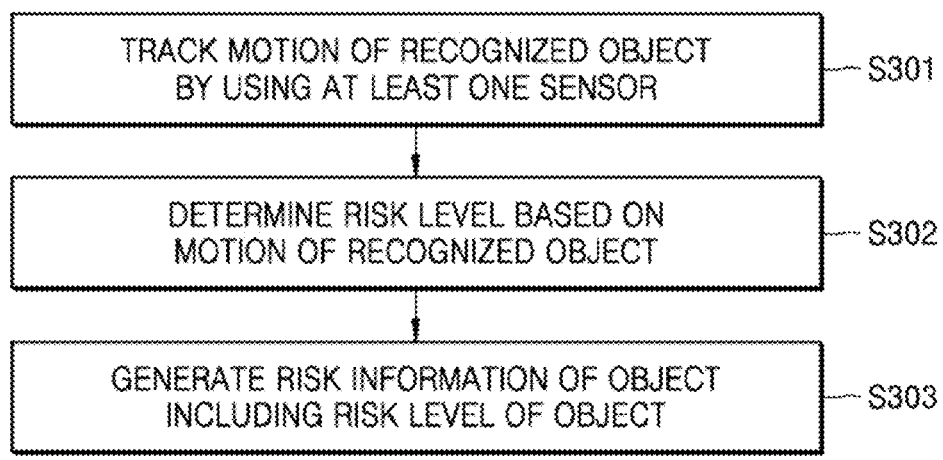
FIG. 3 is a flowchart of an example in which an electronic apparatus generates risk information, according to an embodiment.

FIG. 3 is a flowchart for describing an example in which the electronic apparatus 100 generates risk information, according to an embodiment. The flowchart of FIG. 3 corresponds to operation S202 of FIG. 2 for generating the risk information.

Figure 15:
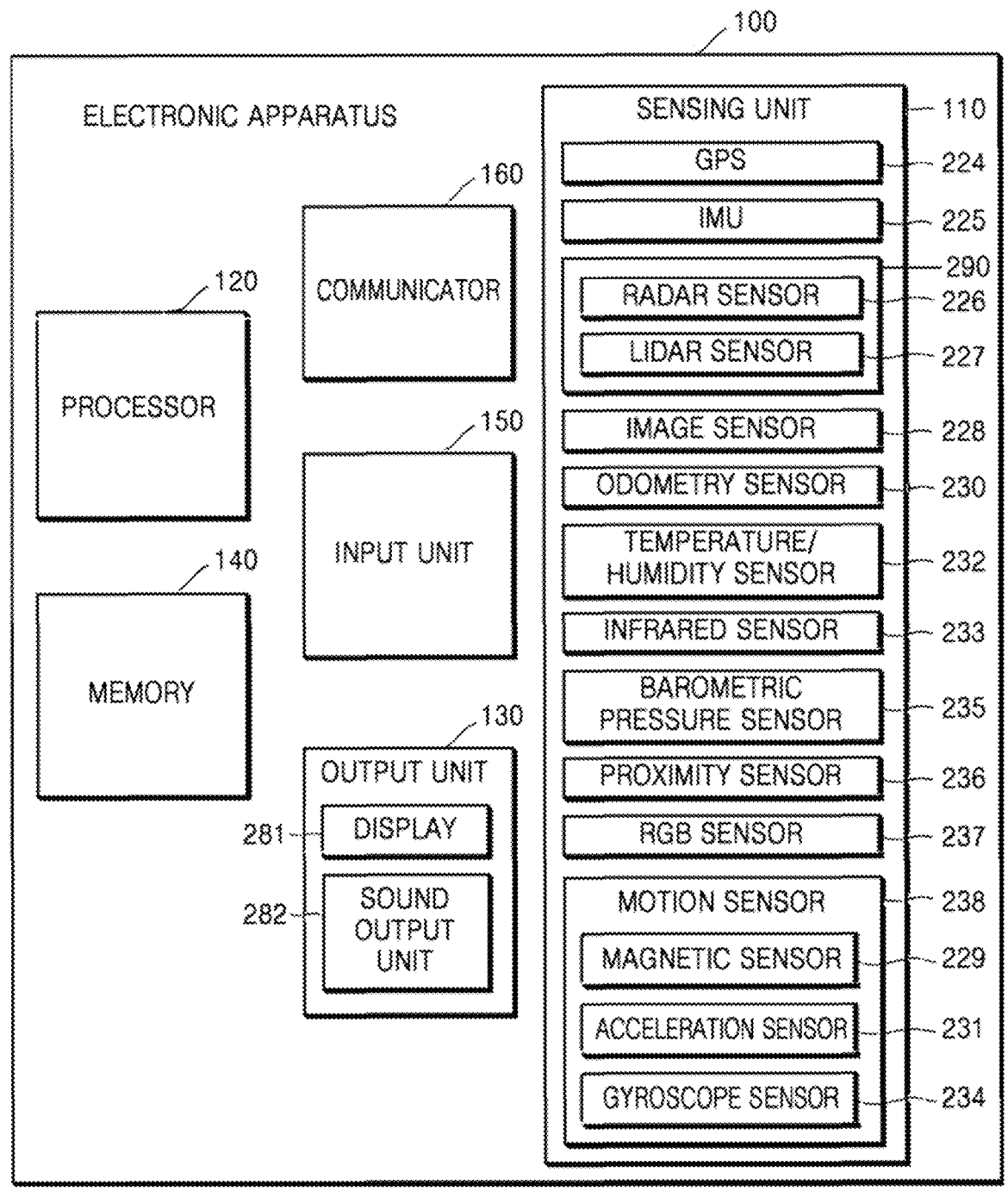
FIG. 15 is a block diagram of an electronic apparatus according to an embodiment.

In operation S301 of FIG. 3, the electronic apparatus 100 may track motion of a recognized object by using sensing unit 110 (see FIG. 15).

According to an embodiment, the electronic apparatus 100 may track the motion of the recognized object by sensing a speed, an acceleration, and a direction of the recognized object, a distance from the vehicle 1 to the object, etc. by using sensing unit 110 (see FIG. 15).

According to an embodiment, the electronic apparatus 100 may track the motion of the object by performing image processing for tracking location variations of an object included in a series of image frames obtained using the image sensor 228 for example a camera (see FIG. 15) which performs object tracking.

In operation S302 of FIG. 3, the electronic apparatus 100 may determine a risk level based on the motion of the recognized object.

According to an embodiment, the electronic apparatus 100 may determine whether a danger of the vehicle 1 is predicted due to the object, by analyzing the speed, the acceleration, and the direction of the recognized object, the distance from the vehicle 1 to the object, etc.

For example, upon determining that a front vehicle repeats sudden acceleration and sudden deceleration, a risk level of the front vehicle may be determined to be high (e.g., risk level 10).

For example, upon determining that the vehicle recognized in a front direction of the vehicle 1 is being slowly driven in zigzags, the risk level of the front vehicle may be determined to be, for example, risk level 7.

As another example, the electronic apparatus 100 may sense the object (e.g., the front vehicle) near the vehicle 1 and determine, for example, the risk level of the object to be 0 upon determining that the object will not cause a danger for the vehicle 1, based on a speed of the object, a direction of the object, a distance between the vehicle 1 and the object, etc.

In operation S303 of FIG. 3, the electronic apparatus 100 may generate risk information of the object including the risk level of the object.

According to an embodiment, the risk information of the object may include the risk level of the object. According to an embodiment, the electronic apparatus 100 may generate the risk information of the object by analyzing the risk level of the object recognized using sensing unit 11 (see FIG. 15).

According to an embodiment, the electronic apparatus 100 may determine whether to adjust a bounding box, based on the risk information of the object generated by analyzing the risk level of the object recognized near the vehicle 1 while the vehicle 1 is being driven. As such, the electronic apparatus 100 may provide a safe autonomous driving environment.

FIG. 3 illustrates an embodiment of the disclosure, and the disclosure is not limited thereto.

Figure 4A:
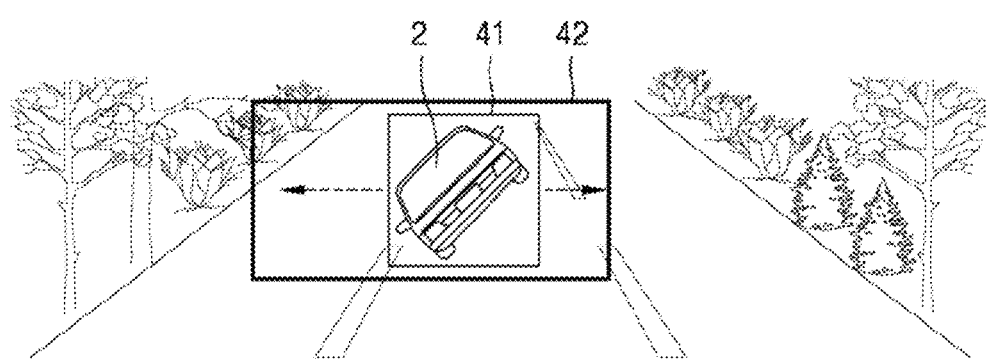
FIGS. 4A, 4B, and 4C are diagrams showing examples in which an electronic apparatus adjusts a bounding box, based on risk information of an object, according to an embodiments.
Figure 4B:
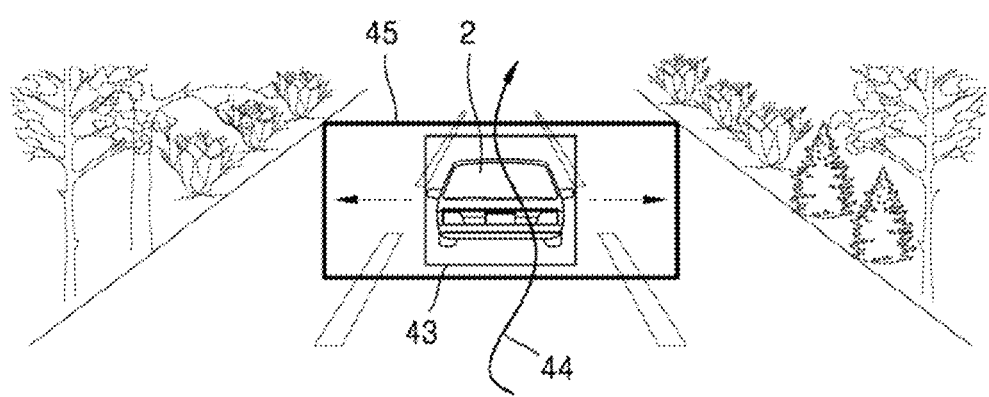
Figure 4C:
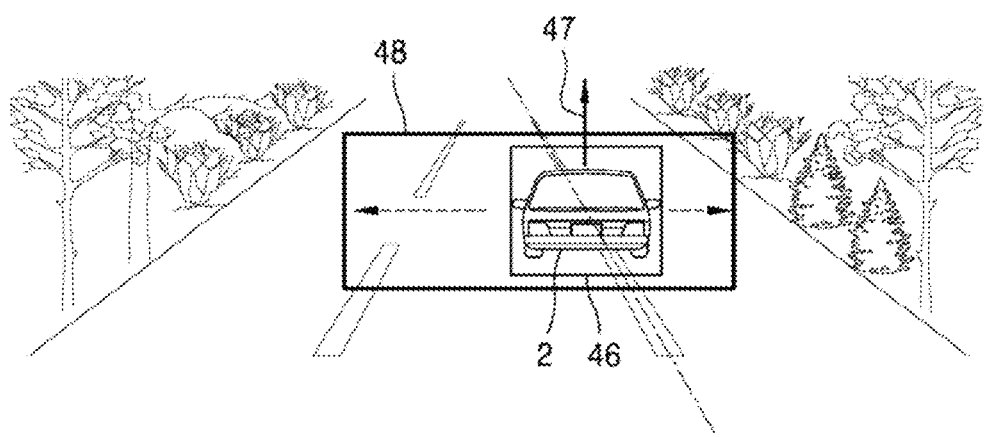

FIGS. 4A to 4C are diagrams for describing examples in which the electronic apparatus 100 adjusts a bounding box, based on risk information of an object, according to embodiments of the disclosure.

FIGS. 4A to 4C illustrate cases in which front vehicle 2 is being driven in a front direction of the autonomous vehicle 1.

FIG. 4A illustrates a case in which the front vehicle 2 has a risk of an overturn. According to an embodiment, when a risk of an overturn of the front vehicle 2 is sensed, the electronic apparatus 100 may extend the size of a bounding box 41 including the front vehicle 2. The electronic apparatus 100 may control a driving operation of the vehicle 1, based on the extended bounding box 42.

FIG. 4B illustrates a case in which the front vehicle 2 is being driven in zigzags. According to an embodiment, when a zigzag driving pattern 44 of the front vehicle 2 is sensed, the electronic apparatus 100 may extend the size of a bounding box 43 including the front vehicle 2. The electronic apparatus 100 may control a driving operation of the vehicle 1, based on the extended bounding box 45.

FIG. 4C illustrates a case in which the front vehicle 2 is being driven without keeping its lane. According to an embodiment, when a line crossing 47 of the front vehicle 2 is sensed, the electronic apparatus 100 may extend the size of a bounding box 46 including the front vehicle 2. The electronic apparatus 100 may control a driving operation of the vehicle 1, based on the extended bounding box 48.

Figure 5A:
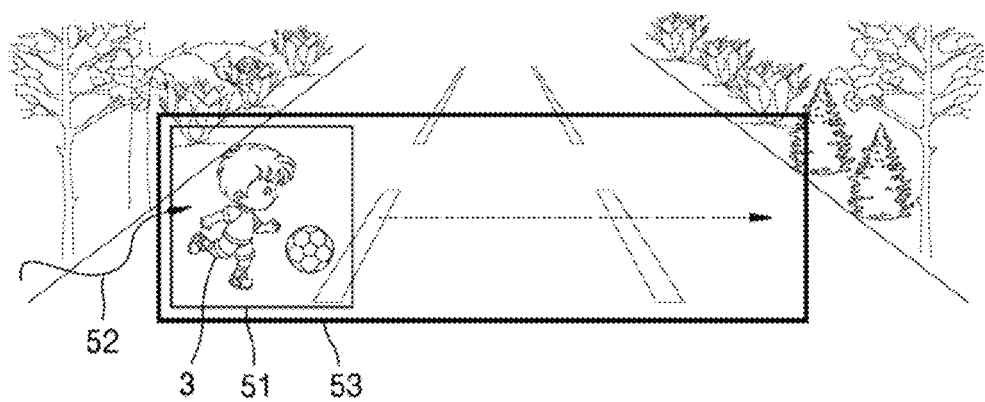
Figure 5B:
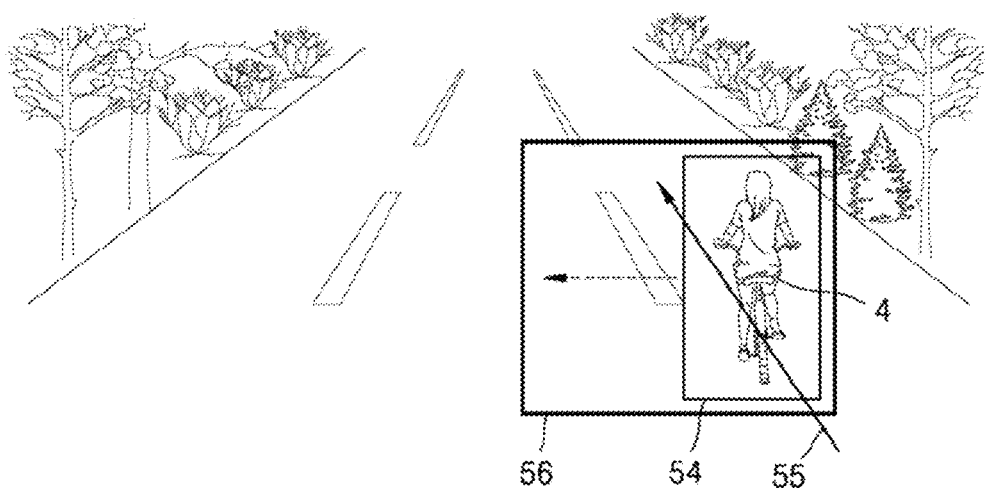

FIGS. 5A and 5B are diagrams for describing examples in which the electronic apparatus 100 adjusts a bounding box, based on risk information of an object, according to other embodiments of the disclosure.

FIGS. 5A and 5B illustrate cases in which a person enters a driving route of the autonomous vehicle 1.

FIG. 5A illustrates a case in which a child 3 runs into the road after a ball. According to an embodiment, when the child 3 running into the road (see reference numeral 52) is sensed, the electronic apparatus 100 may extend the size of a bounding box 51 including the child 3. The electronic apparatus 100 may control a driving operation of the vehicle 1, based on the extended bounding box 53.

FIG. 5B illustrates a case in which a person 4 rides a bicycle on the road. According to an embodiment, when the person 4 riding a bicycle in the middle of the road (see reference numeral 55) is sensed, the electronic apparatus 100 may extend the size of a bounding box 54 including the person 4 riding a bicycle. The electronic apparatus 100 may control a driving operation of the vehicle 1, based on the extended bounding box 56.

FIGS. 4A to 5B illustrate embodiments of the disclosure, and the disclosure is not limited thereto.

Figure 6:
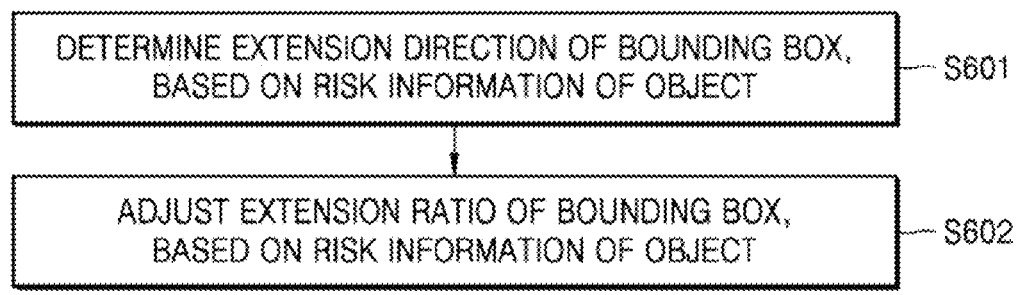
FIG. 6 is a flowchart of an example of adjusting an extension direction and an extension ratio of a bounding box, according to an embodiment.
Figure 7A:
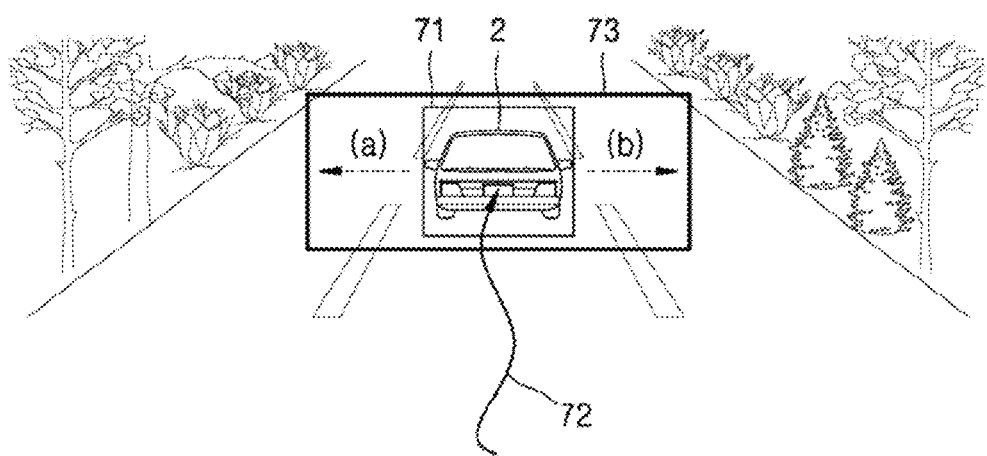
FIGS. 7A and 7B are diagrams showing examples of adjusting an extension direction of a bounding box, according to an embodiment.
Figure 7B:
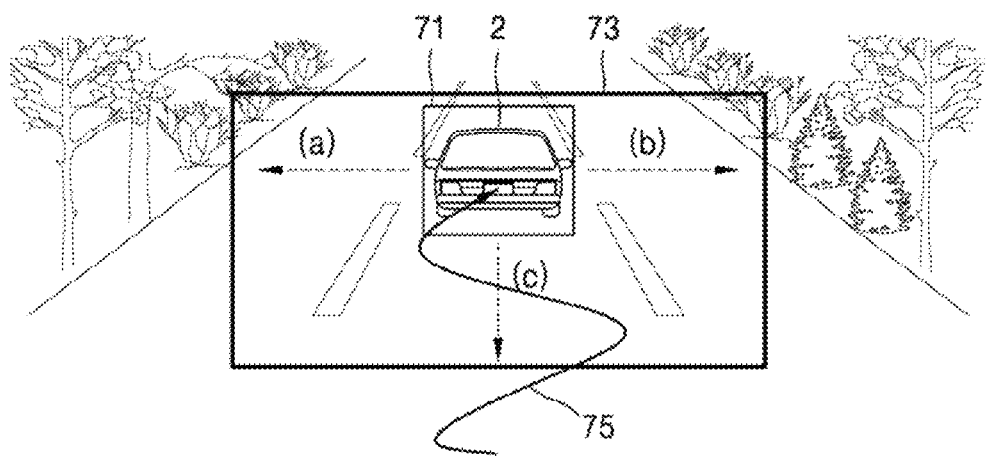
Figure 8A:
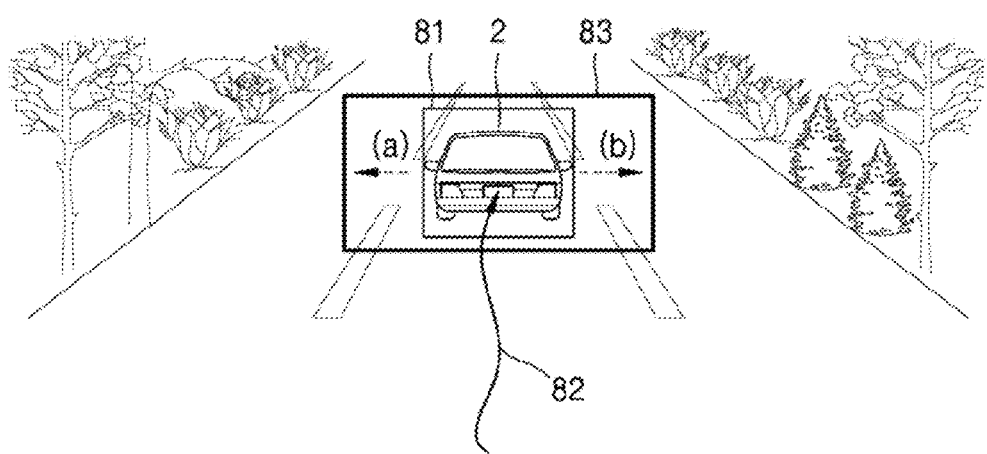
FIGS. 8A and 8B are diagrams showing examples of adjusting an extension ratio of a bounding box, according to embodiments of the disclosure.
Figure 8B:
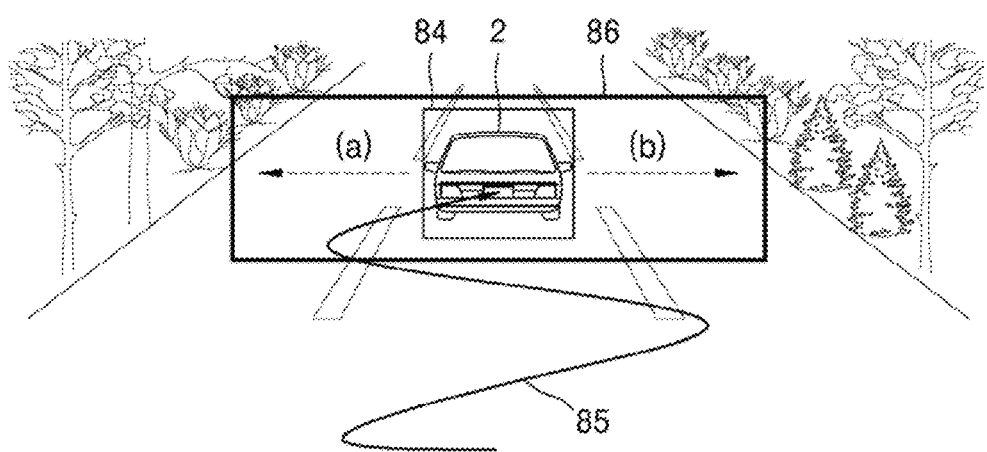

FIG. 6 is a flowchart for describing an example of adjusting an extension direction and an extension ratio of a bounding box, according to an embodiment. FIGS. 7A and 7B are diagrams for describing examples of adjusting an extension direction of a bounding box, according to embodiments of the disclosure. FIGS. 8A and 8B are diagrams for describing examples of adjusting an extension ratio of a bounding box, according to embodiments of the disclosure. The flowchart of FIG. 6 will now be described in conjunction with FIGS. 7A to 8B.

FIGS. 7A to 8B illustrate cases in which front vehicle 2 is being driven in a front direction of the autonomous vehicle 1.

In operation S601 of FIG. 6, the electronic apparatus 100 may determine an extension direction of a bounding box, based on risk information of an object.

FIG. 7A illustrates an example in which a bounding box 71 is extended in a direction (a) and a direction (b).

According to an embodiment, when the front vehicle 2 is being driven in zigzags, the electronic apparatus 100 may extend the bounding box 71 in the direction (a) and the direction (b), based on risk information generated according to a zigzag driving pattern 72 of the front vehicle 2. The electronic apparatus 100 may control a driving, operation of the vehicle 1, based on the extended bounding box 73.

FIG. 7B illustrates an example in which a bounding box 71 is extended in a direction (a), a direction (b), and a direction (c).

According to an embodiment, when the front vehicle 2 is being driven in zigzags, the electronic apparatus 100 may extend the bounding box 71 in the direction (a), the direction (b) and the direction (c), based on risk information generated according to a zigzag driving pattern 75 of the front vehicle 2.

For example, when the zigzag driving pattern 75 of the front vehicle 2 is crossing lines at both sides, the bounding box 71 may be further extended in the direction (c). The electronic apparatus 100 may control a driving operation of the vehicle 1, based on the extended bounding box 73.

As such, the electronic apparatus 100 may ensure a safe distance from the front vehicle 2 by performing driving control not to approach the front vehicle 2.

According to an embodiment, while the vehicle 1 is being driven, the electronic apparatus 100 may update the risk information of the front vehicle 2 in a preset cycle and re-determine the extension direction of the bounding box, based on the updated risk information, e.g., based on a change in a risk level.

Although not shown in FIGS. 7A and 7B, the electronic apparatus 100 may extend the bounding box only in the direction (c), but is not limited thereto. According to an embodiment, the electronic apparatus 100 may extend the bounding box in at least one of the direction (a), the direction a)), or the direction (c).

In operation S602 of FIG. 6, the electronic apparatus 100 may adjust an extension ratio of the bounding box, based on the risk information of the object.

According to an embodiment, the electronic apparatus 100 may adjust the extension ratio of the bounding box, based on a degree of danger of a zigzag driving, pattern of the front vehicle 2.

Referring to FIGS. 8A and 8B, according to an embodiment, when the front vehicle 2 is being driven in zigzags, the electronic apparatus 100 may extend a bounding box 81 or 84 in a direction (a) and a direction (b), based on risk information generated according to a zigzag driving pattern 82 or 85 of the front vehicle 2.

As illustrated in FIG. 8A, when the zigzag driving pattern 82 of the front vehicle 2 is not dangerous, the extension ratio of the bounding box may be determined to be low. The electronic apparatus 100 may extend the bounding box 81, based on the determined extension ratio. The electronic apparatus 100 may control a driving operation of the vehicle 1, based on the extended bounding box 83.

As illustrated in FIG. 8B, when the zigzag driving pattern 85 of the front vehicle 2 is dangerous, e.g., crossing lines at both sides, the extension ratio of the bounding box may be determined to be high. The electronic apparatus 100 may extend the bounding box 84, based on the determined extension ratio. The electronic apparatus 100 may control a driving operation of the vehicle 1, based on the extended bounding box 86.

According to an embodiment, while the vehicle 1 is being driven, the electronic apparatus 100 may update the risk information of the front vehicle 2 in a preset cycle and re-determine. The extension ratio of the bounding box, based on the updated risk information, e.g., based on a change in a risk level.

According to an embodiment, the electronic apparatus 100 may adjust the extension ratio differently for each extension direction of the bounding box, based on a driving direction, a driving speed, etc. of the front vehicle 2.

According to an embodiment, the electronic apparatus 100 may adjust the extension ratio differently for each extension direction of the bounding box, based on a status of nearby lanes adjacent to the front vehicle 2.

According to an embodiment, the electronic apparatus 100 may provide a safe autonomous driving environment by adaptively adjusting the size of the bounding box, based on the object near the vehicle 1.

FIGS. 7A to 8B illustrate embodiments of the disclosure, and the disclosure is not limited thereto.

Figure 9:
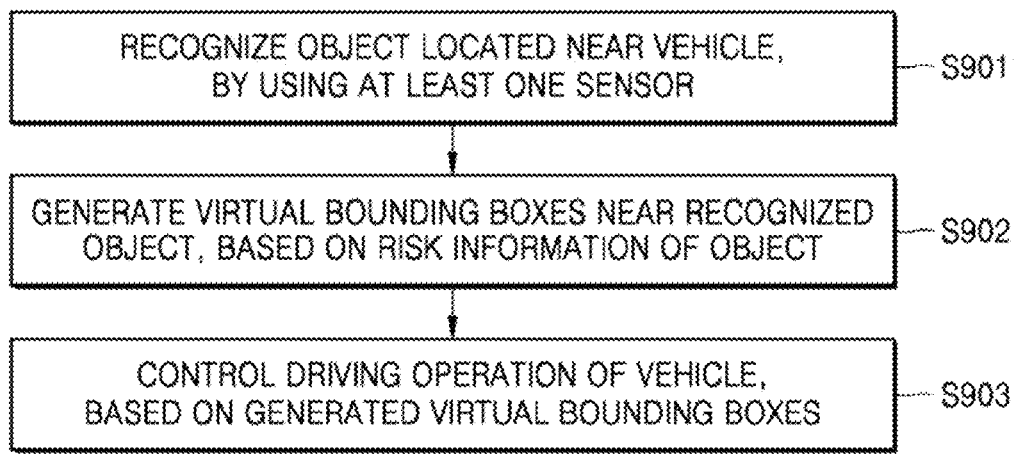
FIG. 9 is a flowchart showing an example of generating virtual bounding boxes according to an embodiment.
Figure 10:
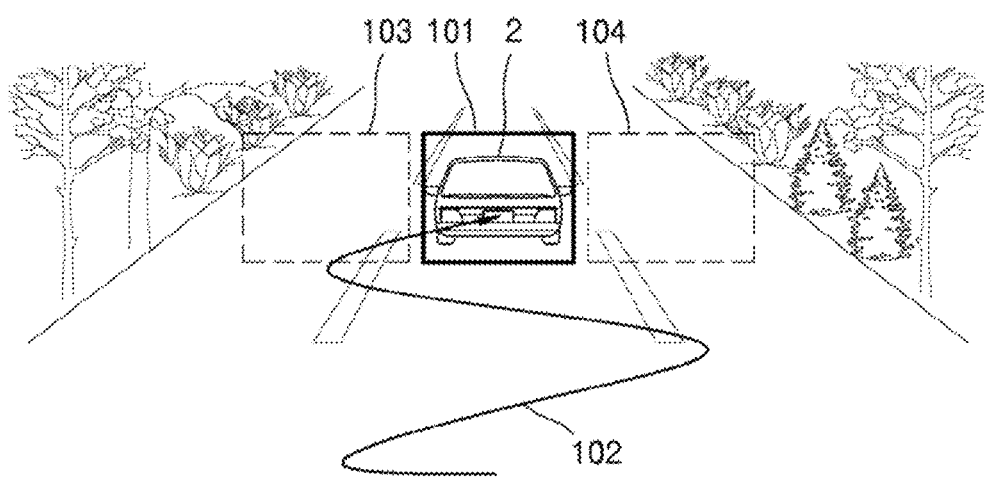
FIG. 10 is a diagram showing an example of generating virtual bounding boxes, according to an embodiment.

FIG. 9 is a flowchart for describing an example of generating virtual bounding boxes, according to an embodiment FIG. 10 is a diagram for describing an example of generating virtual bounding boxes, according to an embodiment. The flowchart of FIG. 9 will now be described in conjunction with FIG. 10.

FIG. 10 illustrates a case in which front vehicle 2 is being driven in a front direction of the autonomous vehicle 1.

In operation S901 of FIG. 9, the electronic apparatus 100 may recognize an object located near the vehicle 1, by using sensing unit 110 (see FIG. 15). The operation, performed by the electronic apparatus 100, of recognizing the object near the vehicle 1, according to an embodiment, is described. In detail above in relation to operation S201 of FIG. 2.

In operation S902 of FIG. 9, the electronic apparatus 100 may generate virtual bounding boxes near the recognized object, based on risk information of the object.

According to an embodiment, the virtual bounding boxes refer to bounding boxes where an object is not actually recognized but which are virtually generated as if an object is recognized. I.e., in comparison to the bounding box which includes an object, as described above, the virtual bounding boxes do not include the object with reference to which the analysis is performed.

Referring to FIG. 10, when the front vehicle 2 is being driven in zigzags to cross lines at both sides (see reference numeral 102), the electronic apparatus 100 may generate virtual bounding boxes 103 and 104 at left and right nearby regions of a bounding box 101 including the front vehicle 2.

In operation S903 of FIG. 9, the electronic apparatus 100 may control driving operation of the vehicle 1 based on the generated virtual bounding boxes.

Referring to FIG. 10, the electronic apparatus 100 may control a driving operation of the vehicle 1, based on the bounding box 101 including the front vehicle 2, and the virtual bounding boxes 103 and 104 generated at left and right sides of the bounding box 101.

According to an embodiment, due to the virtual bounding boxes 103 and 104 generated at left and right sides of the front vehicle 2, the vehicle 1 cannot attempt to pass through a left or right nearby space of the front vehicle 2, and thus provide a safe autonomous driving environment.

FIG. 10 illustrates an embodiment of the disclosure, and the disclosure is not limited thereto.

Figure 11:
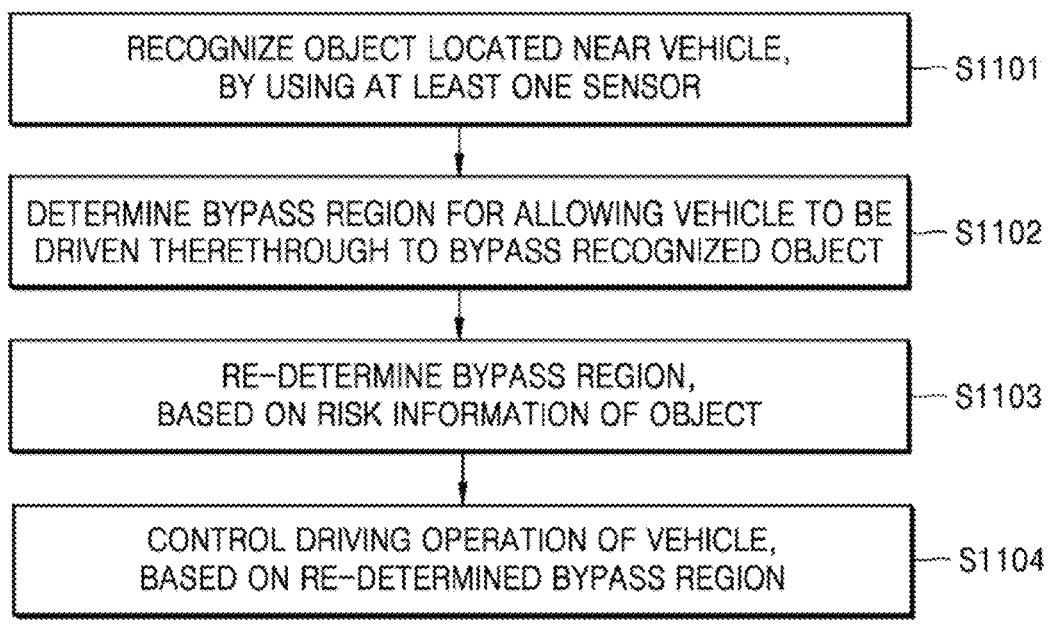
FIG. 11 is a flowchart of an example of re-determining a bypass region, according to an embodiment.
Figure 12:
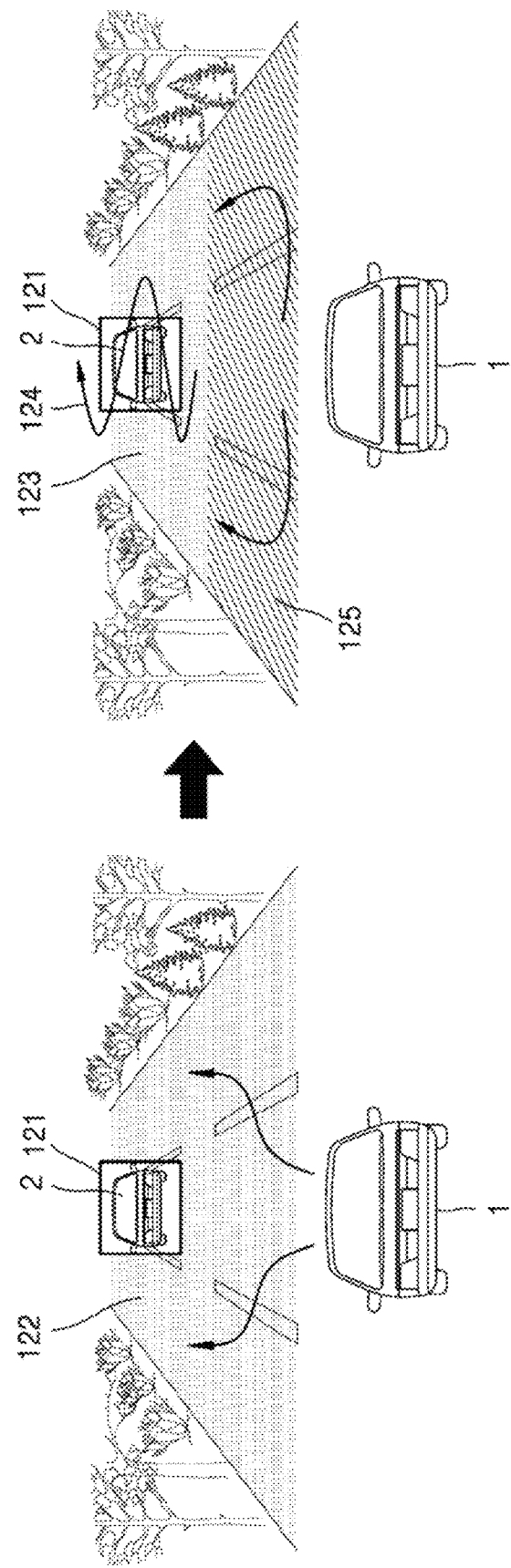
FIG. 12 is a diagram showing an example of re-determining a bypass region, according to an embodiment.

FIG. 11 is a flowchart for describing an example of re-determining a bypass region, according to an embodiment. FIG. 12 is a diagram for describing an example of re-determining a bypass region, according to an embodiment. The flowchart of FIG. 11 will now be described in conjunction with FIG. 12.

FIG. 12 illustrates a case in which front vehicle 2 is being driven in a front direction of the autonomous vehicle 1.

In operation S1101 of FIG. 11, the electronic apparatus 100 may recognize an object located near the vehicle 1, by using sensing unit 110 (see FIG. 15). The operation, performed by the electronic apparatus 100, of recognizing the object near the vehicle 1, according to an embodiment, is described in detail above in relation to operation S201 of FIG. 2.

In operation S1102 of FIG. 11, the electronic apparatus 100 may determine a bypass region for allowing, the vehicle 1 to be driven therethrough to bypass the recognized object.

According to an embodiment, the bypass region may be a nearby region to a certain distance from a bounding box including the recognized object and be determined as a region for allowing the vehicle 1 to be continuously driven therethrough to bypass the recognized object.

Referring to FIG. 12, for example, a bypass region 122 for allowing the vehicle 1 to be driven therethrough to bypass the front vehicle 2 may be determined.

In operation S1103 of FIG. 11, the electronic apparatus 100 may re-determine the bypass region, based on risk information of the object, e.g., based on a change in a risk level. In operation S1104 of FIG. 11, the electronic apparatus 100 may control a driving operation of the vehicle 1, based on the re-determined bypass region.

According to an embodiment, the electronic apparatus 100 may re-determine the bypass region by excluding at least a partial region near the recognized object from the bypass region, based on the risk information of the object, e.g., based on an increase in a risk level.

Referring to FIG. 12, the electronic apparatus 100 may control a driving operation, based on a bypass region 125 re-determined by excluding a partial region 123 near the front vehicle 2 from the bypass region 122.

For example, when a risk level of the front vehicle 2 is not recognized, the autonomous vehicle 1 may pass the front vehicle 2 by using the bypass region 122 determined near a bounding box 121 of the front vehicle 2. However, when a risk level based on a zigzag driving pattern 124 of the front vehicle 2 is determined, the electronic apparatus 100 may control a driving operation, based on the re-determined bypass region 125, and thus keep a safe distance without approaching the front vehicle 2.

According to an embodiment, the electronic apparatus 100 may extend or reduce at least the partial region to be excluded from the bypass region, based on the risk information of the object.

According to an embodiment, the electronic apparatus 100 may extend the partial region to be excluded from the bypass region, when the risk level of the object is higher, e.g., above 5. According to an embodiment, the electronic apparatus 100 may reduce the partial region to be excluded from the bypass region, when the risk level of the object is lower, e.g., equal to or less than 5.

For example the electronic apparatus 100 may reduce the bypass region when the front vehicle 2 being driven in zigzags is sensed, and then extend the partial region to be excluded from the bypass region, when the front vehicle 2 repeats sudden acceleration and sudden deceleration and thus the risk level is increased. Referring to FIG. 12, the re-determined bypass region 125 may be further reduced by extending the partial region to be excluded from the bypass region 122.

According to an embodiment, the electronic apparatus 100 may keep a safe distance from the front vehicle 2 and provide a stable autonomous driving environment by determining only the reduced bypass region 125 as an allowed bypass region.

FIGS. 11 and 12 are diagrams for describing an embodiment of the disclosure, and the disclosure is not limited thereto.

Figure 13:
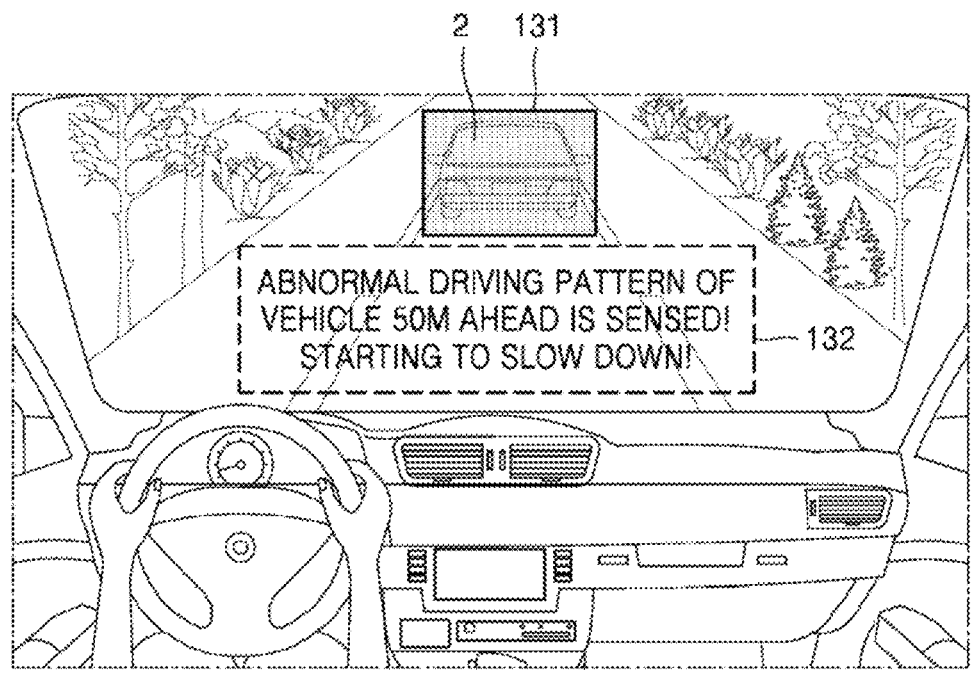
FIG. 13 is a diagram showing an example of providing a notification about a vehicle driving status, according to an embodiment.

FIG. 13 is a diagram for describing an example of providing a notification about a vehicle driving status, according to an embodiment.

According to an embodiment, the electronic apparatus 100 may provide a notification about a driving status to a driver or a passenger of the vehicle 1 through an output unit 130 (see FIG. 15) (e.g., a display 281 or a sound output unit 282 (sec FIG. 15)), based on risk information of an object.

As illustrated in FIG. 13, for example, the electronic apparatus 100 may display a notification message 132 about the driving status (e.g., "Abnormal driving pattern of vehicle 50 m ahead is sensed! Starting to slow down!") on a display disposed in the vehicle 1, e.g., a head-up display, an overhead display, a dashboard display, a head mounted display, etc.; however, this is not limiting.

As another example, the electronic apparatus 100 may output the notification message about the driving status through the sound output unit 282 (see FIG. 15), but is not limited thereto.

For example, when a risk is sensed, the electronic apparatus 100 may output a warning sound through the sound output unit 282 (see FIG. 15).

For example, the electronic apparatus 100 may highlight (see reference numeral 131), on the head-up display, the front vehicle 2 recognized as being driven dangerously.

According to an embodiment, the electronic apparatus 100 may provide a safe driving environment to the driver by notifying the driver of a risk and preliminarily providing a warning to prevent an accident.

Figure 14:
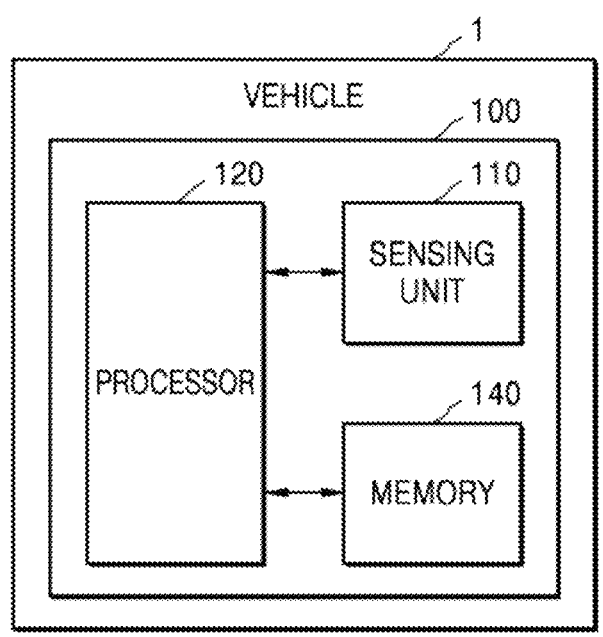
FIG. 14 is a block diagram of an electronic apparatus according to an embodiment.

FIG. 14 is a block diagram of the electronic apparatus 100 according to an embodiment.

According to an embodiment, the electronic apparatus 100 may include a sensing unit 110, a memory 140, and a processor 120, however this is not limiting. For example, an entirety or a part of the sensors of the sensing unit 110 may be disposed outside of the electronic apparatus 100. Further, although only few elements related to an embodiment are illustrated in the electronic apparatus 100 of FIG. 14, the electronic apparatus 100 may further include any of the above-described elements and/or related art elements in addition to those illustrated in FIG. 14.

According to an embodiment, the sensing unit 110 may sense a surrounding environment of the vehicle 1 while the vehicle 1 is being driven.

The sensing unit 110 may include a plurality of sensors for sensing the surrounding environment of the vehicle 1. For example, the sensing unit 110 may include a distance sensor or distance sensors 290 such as a lidar sensor 227 (see FIG. 15) and/or a radar sensor 226 (see FIG. 15), and an image sensor 228 (see FIG. 15) such as a camera.

The sensing unit 110 may further include one or more actuators configured to change locations and or orientations of the plurality of sensors, and thus sense objects located in front, rear, and side directions of the vehicle 1.

According to an embodiment, the sensing unit 110 may sense the size, a shape, a speed, and a direction of a nearby object of the vehicle 1, a distance between the vehicle 1 and the object, etc.

According to an embodiment, the processor 120 may include at least one processor.

According to an embodiment, the processor 120 may execute one or more instructions to recognize an object located near the vehicle 1 by using sensing unit 110.

The processor 120 may execute one or more instructions to generate risk information of the object including the type of the recognized object.

The processor 120 may execute one or more instructions to determine a risk level of the object by tracking motion of the recognized object by using sensing unit 110.

The processor 120 may execute one or more instructions to determine the risk level of the object, based on at least one of the type of the object, the size of the object, a speed of the object, a direction of the object, a distance between the vehicle 1 and the object, or a space around the object.

The processor 120 may execute one or more instructions to generate the risk information of the object including the risk level of the object.

The processor 120 may execute one or more instructions to adjust the size of a bounding box generated to include at least a part of the recognized object, based on the risk information of the object.

The processor 120 may execute one or more instructions to determine an tension direction of the bounding box, based on the risk information of the object.

The processor 120 may execute one or more instructions to adjust an extension ratio of the bounding box, based on the risk information of the object.

The processor 120 may execute one or more instructions to control a driving operation of the vehicle 1, based on the adjusted bounding box.

The processor 120 may execute one or more instructions to generate virtual bounding boxes near the recognized object, based on the risk information of the object, and control a driving operation of the vehicle 1, based on the generated virtual bounding boxes.

The processor 120 may execute one or more instructions to determine a bypass region for allowing the vehicle 1 to be driven therethrough to bypass the recognized object, re-determine the bypass region, based on the risk information of the object, and control a driving operation of the vehicle 1, based on the re-determined bypass region.

The processor 120 may execute one or more instructions to re-determine the bypass region by excluding at least a partial region near the recognized object from the bypass region, based on the risk information of the object.

The processor 120 may execute one or more instructions to extend or reduce at least the partial region to be excluded from the bypass region, based on the risk information of the object.

The processor 120 may execute one or more instructions to provide a notification about a driving status to a driver or a passenger of the vehicle 1 through an output unit 130 (see FIG. 15), based on the risk information of the object.

FIG. 15 is a block diagram of the electronic apparatus 100 according to an embodiment.

The electronic apparatus 100 may include the sensing unit 110, the processor 120, an output unit 130, the memory 140, an input unit 150, and a communicator 160, e.g., a communication unit, a communication interface, etc.

The sensing unit 110 may include a plurality of sensors configured to obtain information about an environment where the vehicle 1 is located, and one or more actuators configured to change locations and/or orientations of the sensors, for example, to enable a continual or more accurate tracking of the object by the electronic apparatus 100. For example, the sensing unit 110 may include a global positioning system (GPS) 224, an inertial measurement unit (IMU) 225, a radar sensor 226, a lidar sensor 227, an image sensor 228, and an odometry sensor 230. The sensing unit 110 may further include at least one of a temperature/humidity sensor 232, an infrared sensor 233, a barometric pressure sensor 235, a proximity sensor 236, or an RGB sensor 237, e.g., an illuminance sensor, but is not limited thereto. Functions of the sensors may be intuitively inferred from their names by one of ordinary skill in the an, and thus detailed descriptions thereof will not be provided herein. For example, an entirety or a pan of the sensors of the sensing unit 110 may be disposed outside of the electronic apparatus 100.

The sensing unit 110 may further include a motion sensor 238 capable of sensing motion of the vehicle 1. The motion sensor 238 may include a magnetic sensor 229, an acceleration sensor 231, and a gyroscope sensor 234.

The GPS 224 may be a sensor configured to estimate a geographical location of the vehicle 1. That is, the GPS 224 may include a transceiver configured to estimate a location of the vehicle 1 on the earth.

The IMU 225 may include a combination of sensors configured to sense location and orientation variations of the vehicle 1, based on an inertial acceleration. For example, the combination of sensors may include accelerometers and gyroscopes.

The radar sensor 226 may be a sensor configured to sense objects in an environment where the vehicle 1 is located, by using radio signals. The radar sensor 226 may be configured to sense speeds and/or directions of the objects.

The lidar sensor 227 may be a sensor configured to sense objects in the environment where the vehicle 1 is located, by using laser beams. Specifically, the lidar sensor 227 may include a laser light source and/or a laser scanner configured to irradiate laser beams, and a detector configured to detect reflection of the laser beams. The lidar sensor 227 may be configured to operate in a coherent detection mode (for example, heterodyne detection is used) or an incoherent detection mode.

The image sensor 228 may be a still camera or a video camera configured to photograph an external environment of the vehicle 1. For example, the image sensor 228 may include a plurality of cameras, and the plurality of cameras may be positioned at a plurality of locations inside and outside the vehicle 1.

The odometry sensor 230 may estimate a location of the vehicle 1 and measure a distance by which the vehicle 1 moves. For example, the odometry sensor 230 may measure a location variation of the vehicle 1 by using the number of revolutions of a wheel of the vehicle 1.

The memory 140 may include a magnetic disk drive, an optical disk drive, or flash memory. Alternatively, the memory 140 may be a portable universal serial bus (USB) data storage device. The memory 140 may store system software for performing methods related to the disclosure. The system software for performing methods related to the disclosure may be stored in a portable storage medium.

The communicator 160 may include at least one antenna for communicating with another device in a wireless manner. For example, the communicator 160 may be used to communicate with a cellular network or another radio protocol and system in a wireless manner via Wi-Fi or Bluetooth. The communicator 160 controlled by the processor 120 may transmit and receive radio signals. For example, the processor 120 may execute a program included in the memory 140 to allow the communicator 160 to transmit and receive radio signals to and from the cellular network.

The input unit 150 refers to a means for inputting data to control the vehicle 1 and/or electronic apparatus 100. For example, the input unit 150 may include a keypad, a dome switch, a touchpad (e.g., a capacitive overlay, resistive overlay, infrared beam, surface acoustic wave, integral strain gauge, or piezoelectric touchpad), a jog wheel, or a jog switch, but is not limited thereto. The input unit 150 may further include a microphone configured to receive audio data (e.g., a voice command) from a driver or a passenger of the vehicle 1.

The output unit 130 may output audio signals or video signals, and include a display 281 and a sound output unit 282.

The display 281 may include at least one of a liquid crystal display (LCD), a thin film transistor-LCD (TFT-LCD), an organic LED (OLED), a flexible display, a three-dimensional (3D) display, or an electrophoretic display. Depending on implementation of the output unit 130, the output unit 130 may include two or more displays 281.

The sound output unit 282 outputs audio data received from the communicator 160 or stored in the memory 140. The sound output unit 282 may include, for example, a speaker or a buzzer.

The input unit 150 and the output unit 130 may include a network interface, and be implemented as a touchscreen.

The processor 120 may control the sensing unit 110, the communicator 160, the input unit 150, the memory 140, and the output unit 130 by executing programs stored in the memory 140.

Figure 16:
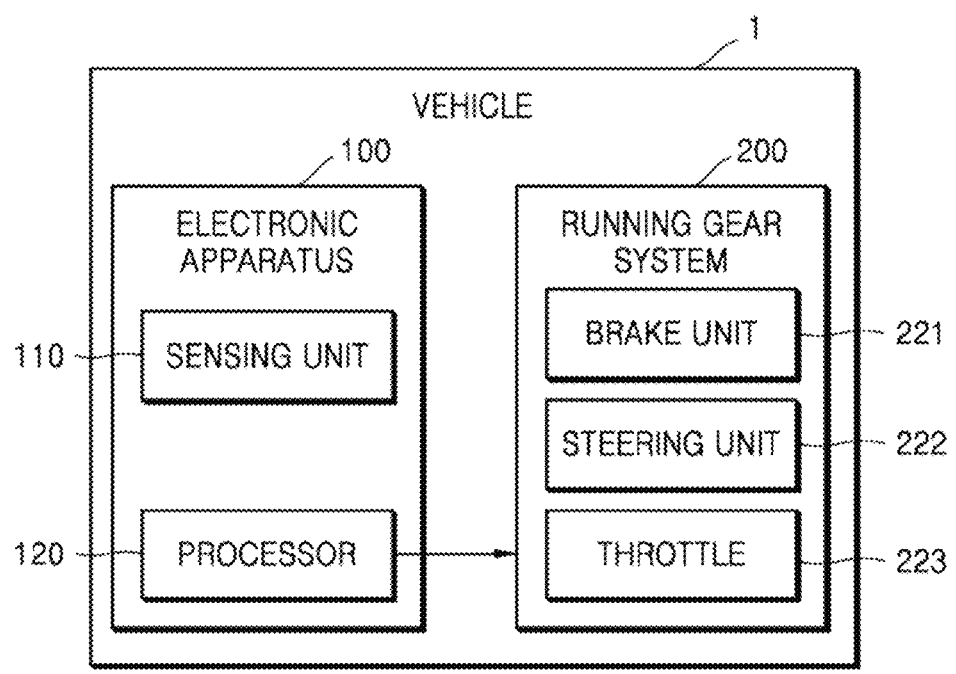
FIG. 16 is a block diagram of a vehicle according to an embodiment.

FIG. 16 is a block diagram of the vehicle 1 according to an embodiment.

According to an embodiment, the vehicle 1 may include the electronic apparatus 100 and a running gear system 200. Although only few elements related to an embodiment are illustrated in the vehicle 1 of FIG. 16, the vehicle 1 may further include any of the above-described elements and/or related art elements in addition to those illustrated in FIG. 16.

The electronic apparatus 100 may include the sensing unit 110 and the processor 120.

Detailed descriptions of the sensing unit 110 and the processor 120 are provided above in relation to FIGS. 14 and 15, and thus will not be repeated herein.

The running gear system 200 may include a brake unit 221, a steering unit 222, and a throttle 223.

The steering unit 222 may include a combination of mechanisms configured to control a direction of the vehicle 1.

The throttle 223 may include a combination of mechanisms configured to control a speed of the vehicle 1 by controlling a speed of an engine/motor. The throttle 223 may control the amount of a mixture gas of fuel and air supplied into the engine/motor by adjusting opening of the throttle 223, and control power and thrust by adjusting opening of the throttle 223.

The brake unit 221 may include a combination of mechanisms configured to decelerate the vehicle 1. For example, the brake unit 221 may use friction to reduce a speed of wheels/tires.

An electronic apparatus according to the embodiments may include a processor, a memory configured to store and execute program data, a permanent storage such as a disk drive, a communication port configured to communicate with an external device, and a user interface device such as a touch panel, keys, or buttons. Methods implemented by software modules or algorithms may be recorded on a computer-readable recording medium as computer-readable codes or program commands executable by the processor. Examples of the computer-readable recording medium include magnetic storage media (e.g., read-only memory (ROM), random-access memory (RAM), floppy disks, and hard disks) and optical recording media (e.g., compact disc-ROM (CD-ROM) and digital versatile discs (DVDs)). The computer-readable recording medium may also be distributed over network coupled computer systems so that a computer-readable code is stored and executed in a distributed fashion. The medium may be read by a computer, stored in a memory, and executed by a processor.

The disclosure may be described in terms of functional block components and various processing steps. Such functional blocks may be implemented by any number of hardware and/or software components configured to perform the specified functions. For example, the disclosure may employ integrated circuit components, e.g., memory elements, processing elements, logic elements, and look-up tables, which may carry out a variety of functions under the control of one or more microprocessors or other control devices. Similarly, where the elements of the disclosure are implemented using software programming Or software elements, the disclosure may be implemented with any programming or scripting language such as C, C++, Java, or assembler, with the various algorithms being implemented with any combination of data structures, processes, routines or other programming elements. Functional aspects may be implemented using algorithms executed by one or more processors. Furthermore, the disclosure may employ any number of known techniques for electronic setup, signal processing, and/or data processing. Terms such as "mechanism", "element", "means", and "configuration" may be used broadly and are not limited to mechanical and physical components. These terms may include software routines in association with a processor or the like.

Particular implementations described herein merely correspond to embodiments of the disclosure and do not limit the scope of the disclosure in any way. For brevity, descriptions of known electronic configurations, control systems, software, and other functional aspects of the systems are not provided herein.

While the disclosure has been particularly shown and described with reference to embodiments thereof, it will be understood by one of ordinary skill in the art that various changes in form and details may be made therein without departing from the scope of the disclosure. Therefore, it should be understood that the embodiments of the disclosure are illustrative in all aspects and do not limit the disclosure. For example, each element described as a single element may be implemented in a distributed manner and, likewise, elements described as distributed elements may be implemented in a combined manner.

All examples and terms used herein are merely for a detailed description of the disclosure and the scope of the disclosure is not limited by those examples and terms unless defined in the claims.

Moreover, no element is essential for implementation of the disclosure unless the element is particularly described as being "essential" or "critical".

It will be understood by one of ordinary skill in the art that the embodiments of the disclosure may be modified without departing from the scope of the disclosure.

It should be understood that various changes in form and details may be made in the embodiments of the disclosure and that the embodiments of the disclosure cover all modifications, equivalents, and alternatives falling within the scope of the disclosure. Therefore, the embodiments of the disclosure should be considered in a descriptive sense only and not for purposes of limitation.

The scope of the disclosure is defined not by the detailed description of the disclosure but by the appended claims, and all variations derived from the scope defined by the claims and their equivalents will be construed as being included in the scope of the disclosure.

As used herein, the term " . . . unit" or "module" denotes an entity for performing at least one function or operation, and may be implemented using hardware, software, or a combination of hardware and software.

The "unit" or "module" may also be implemented as a program stored in an addressable storage medium and executable by a processor.

For example, the term "unit" or "module" may be implemented as elements software elements, object-oriented software elements, class elements, and task elements), processes, functions, attributes, procedures, subroutines, segments of program code, drivers, firmware, micro-codes, circuits, data, a database, data structures, tables, arrays, or variables.

Throughout the disclosure, the expression "A may include one of a1, a2, and a3" broadly means that an example of an element included element A is a1, a2, or a3.

The expression does not limit the element included in element A, to a1, a2, or a3. Therefore, it should be noted that the expression is not restrictively construed to exclude elements other than a1, a2, and a3, from examples of the element included in A.

The expression means that A may include a1, include a2, or include a3. The expression does not mean that elements included in A are always selectively determined within a certain set. For example, it should be noted that the expression is not restrictively construed to limit the element included in element A, to a1, a2, or a3 selected from a set including a1, a2, and a3.

The expression "at least one of a1, a2, or a3" indicates either one of "a1", "a2", "a3", "a1 and a2", "a1 and a3", "a2 and a3", or "a1, a2 and a3", Unless the expression "at least one a1, at least one a2, or at least one a3" is explicitly described, it should be noted that the expression "at least one of a1, a2, or a3" is not construed as "at least one a1", "at least one a2", or "at least one a3".

What is claimed is:

1. An electronic apparatus for assisting driving of a vehicle, the electronic apparatus comprising:
    a sensing unit comprising at least one sensor;
    a memory storing one or more instructions; and
    a processor configured to execute the one or more instructions to:
        identify an object located near the vehicle, by using the at least one sensor;
        generate risk information of the identified object, the risk information comprising a type of the identified object;
        adjust a size of a bounding box generated to include at least a part of the identified object, based on the risk information of the identified object;
        generate virtual bounding boxes near the identified object, based on the risk information of the identified object, wherein the virtual bounding boxes do not include any part of the identified object; and
        control a driving operation of the vehicle, based on the adjusted bounding box and the virtual bounding boxes.

2. The electronic apparatus of claim 1, wherein the processor is further configured to execute the one or more instructions to determine a risk level of the identified object by tracking motion of the identified object by using the at least one sensor.

3. The electronic apparatus of claim 1, wherein the processor is further configured to execute the one or more instructions to determine a risk level of the identified object, based on at least one of the type of the identified object, a size of the identified object, a speed of the identified object, a direction of the identified object, a distance between the vehicle and the identified object, or a space around the identified object.

4. The electronic apparatus of claim 1, wherein the risk information further comprises a risk level of the identified object.

5. The electronic apparatus of claim 1, wherein the processor is further configured to execute the one or more instructions to determine an extension direction of the bounding box, based on the risk information of the identified object.

6. The electronic apparatus of claim 1, wherein the processor is further configured to execute the one or more instructions to adjust an extension ratio of the bounding box, based on the risk information of the identified object.

7. The electronic apparatus of claim 1, wherein the risk information further comprises a risk level of the identified object, and
    the processor is further configured to execute the one or more instructions to:
    determine a bypass region for allowing the vehicle to be driven therethrough to bypass the identified object;
    re-determine the bypass region, based on determining a change in the risk level; and
    control the driving operation of the vehicle, based on the re-determined bypass region.

8. The electronic apparatus of claim 7, wherein the processor is further configured to execute the one or more instructions to re-determine the bypass region by excluding at least a partial region near the identified object from the bypass region, based on the determining an increase in the risk level.

9. The electronic apparatus of claim 8, wherein the processor is further configured to execute the one or more instructions to one of extend or reduce the at least the partial region to be excluded from the bypass region, based on determining a further increase in the risk level or a decrease in the risk level, respectively.

10. The electronic apparatus of claim 1, further comprising an output unit,
    wherein the processor is further configured to execute the one or more instructions to provide a notification about a driving status to a user inside the vehicle through the output unit, based on the risk information of the identified object.

11. A method of assisting driving of a vehicle, the method comprising:
    identifying an object located near the vehicle, by using at least one sensor;
    generating risk information of the identified object, the risk information comprising a type of the identified object;
    adjusting a size of a bounding box generated to include at least a part of the identified object, based on the risk information of the identified object;
    generating virtual bounding boxes near the identified object, based on the risk information of the identified object, wherein the virtual bounding boxes do not include any part of the object; and
    controlling a driving operation of the vehicle, based on the adjusted bounding box and the virtual bounding boxes.

12. The method of claim 11, further comprising determining a risk level of the identified object by tracking motion of the identified object by using the at least one sensor.

13. The method of claim 11, further comprising determining a risk level of the identified object, based on at least one of the type of the identified object, a size of the identified object, a speed of the identified object, a direction of the identified object, a distance between the vehicle and the identified object, or a space around the identified object.

14. The method of claim 11, wherein the generating the risk information of the identified object further comprises generating a risk level of the identified object.

15. The method of claim 11, wherein the adjusting the size of the bounding box comprises determining an extension direction of the bounding box, based on the risk information of the identified object.

16. The method of claim 11, wherein the adjusting the size of the bounding box comprises adjusting an extension ratio of the bounding box, based on the risk information of the identified object.

17. The method of claim 11, wherein the risk information further comprises a risk level of the identified object, and the method further comprises:
determining a bypass region for allowing the vehicle to be driven therethrough to bypass the identified object;
re-determining the bypass region, based on determining a change in the risk level; and
controlling the driving operation of the vehicle, based on the re-determined bypass region.

18. A computer-readable recording medium having recorded thereon a computer program which, when executed by a computer system, causes the computer system to execute the method of claim 11.

* * * * *